United States Patent
Matsuo et al.

(10) Patent No.: US 9,252,832 B2
(45) Date of Patent: Feb. 2, 2016

(54) HIGH-FREQUENCY CIRCUIT AND COMMUNICATION DEVICE

(71) Applicant: TAIYO YUDEN CO., LTD., Tokyo (JP)

(72) Inventors: Nobuaki Matsuo, Kanagawa (JP); Ryuji Murata, Kanagawa (JP); Yuki Matsubayashi, Kanagawa (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 19 days.

(21) Appl. No.: 13/950,569

(22) Filed: Jul. 25, 2013

(65) Prior Publication Data

US 2014/0044022 A1 Feb. 13, 2014

(30) Foreign Application Priority Data

Aug. 10, 2012 (JP) ................................ 2012-178182

(51) Int. Cl.
*H04B 1/00* (2006.01)
*H04B 1/50* (2006.01)
*H04B 1/04* (2006.01)
*H04B 1/18* (2006.01)

(52) U.S. Cl.
CPC .................. *H04B 1/50* (2013.01); *H04B 1/006* (2013.01); *H04B 1/0064* (2013.01); *H04B 1/0458* (2013.01); *H04B 1/18* (2013.01)

(58) Field of Classification Search
None
See application file for complete search history.

(56) References Cited

U.S. PATENT DOCUMENTS

| | | | | |
|---|---|---|---|---|
| 2002/0090974 A1* | 7/2002 | Hagn | ..................... | H04B 1/005 455/552.1 |
| 2003/0189910 A1* | 10/2003 | Yamada et al. | ................ | 370/335 |
| 2008/0139240 A1* | 6/2008 | Lin et al. | ..................... | 455/552.1 |
| 2009/0075608 A1* | 3/2009 | Ichitsubo | ................. | H04B 1/44 455/127.2 |
| 2010/0135193 A1* | 6/2010 | Przadka | ......................... | 370/297 |
| 2012/0230228 A1 | 9/2012 | Oka et al. | | |
| 2013/0273861 A1 | 10/2013 | See | | |

FOREIGN PATENT DOCUMENTS

| | | |
|---|---|---|
| JP | 2011-119981 A | 6/2011 |
| JP | 2015-514381 A | 5/2015 |
| WO | 2013/155305 A1 | 10/2013 |

OTHER PUBLICATIONS

"Definition of Diplex" www.dictionary.com, 2015.*
Japanese Office Action dated Aug. 4, 2015, in a counterpart Japanese patent application No. 2012-178182.

* cited by examiner

*Primary Examiner* — Gregory Sefcheck
*Assistant Examiner* — Jenkey Van
(74) *Attorney, Agent, or Firm* — Chen Yoshimura LLP

(57) ABSTRACT

A high-frequency circuit includes: first duplexers, each including a first transmit filter having a first transmit band, a first receive filter having a first receive band, and a first common terminal to which first ends of the first transmit filter and the first receive filter are commonly connected; a first switch that selects and connects one of the first common terminals to a first antenna; an LPF or BPF that is connected between the first antenna and the first switch, and passes a signal in the first transmit band and the first receive band; and a second duplexer including: a second transmit filter having a second transmit band, a second receive filter having a second receive band, and a second common terminal that is connected to a second antenna and to which first ends of the second transmit filter and the second receive filter are commonly connected.

8 Claims, 10 Drawing Sheets

HIGH-FREQUENCY CIRCUIT AND COMMUNICATION DEVICE

CROSS-REFERENCE TO RELATED APPLICATION

This application is based upon and claims the benefit of priority of the prior Japanese Patent Application No. 2012-178182, filed on Aug. 10, 2012, the entire contents of which are incorporated herein by reference.

FIELD

A certain aspect of the present invention relates to a high-frequency circuit and a communication device.

BACKGROUND

In recent years, there has been studied mobile communication using carrier aggregation technology that simultaneously transmits and receives signals using different frequency bands (e.g. Japanese Patent Application Publication No. 2011-119981).

However, the distorted signal of a transmit signal of a lower frequency band of the frequency bands sometimes becomes stronger than a receive signal of a higher frequency band.

SUMMARY OF THE INVENTION

According to an aspect of the present invention, there is provided a high-frequency circuit including: first duplexers, each including: a first transmit filter having a first transmit band, a first receive filter having a first receive band, and a first common terminal to which a first end of the first transmit filter and a first end of the first receive filter are commonly connected; a first switch that selects and connects one of the first common terminals to a first antenna; an LPF or BPF that is connected between the first antenna and the first switch, and passes a signal in the first transmit band and the first receive band; and a second duplexer including: a second transmit filter having a second transmit band higher in frequency than the first transmit band, a second receive filter having a second receive band higher in frequency than the first receive band, and a second common terminal that is connected to a second antenna and to which a first end of the second transmit filter and a first end of the second receive filter are commonly connected.

According to another aspect of the present invention, there is provided a communication device including: the above described high-frequency circuit.

DETAILED DESCRIPTION

Figure 1:
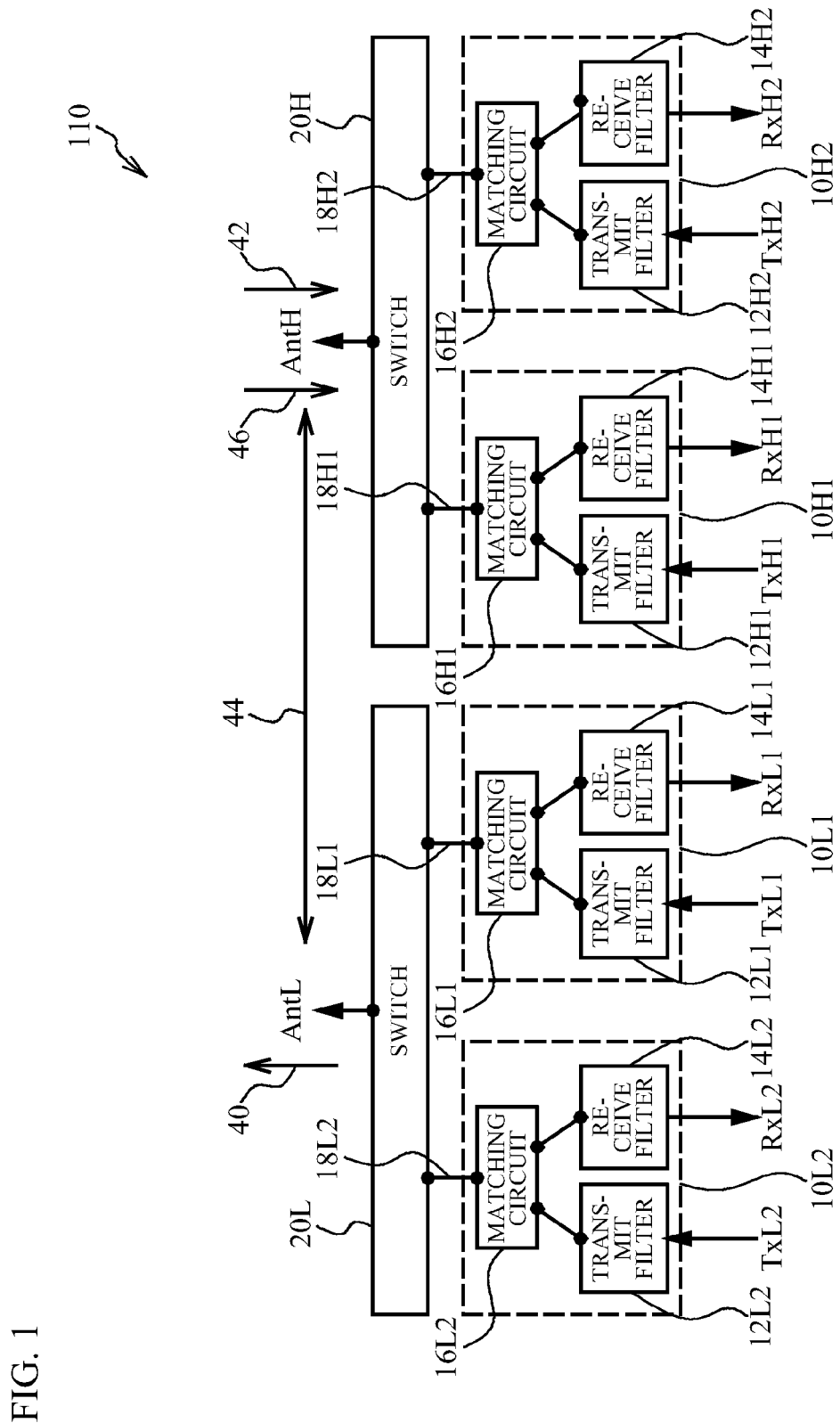
FIG. 1 is a block diagram of a high-frequency circuit in accordance with a comparative example.

A description will be given of a high-frequency circuit used in carrier aggregation technology. FIG. 1 is a block diagram of a high-frequency circuit in accordance with a comparative example. A high-frequency circuit 110 of the comparative example can transmit and receive signals in lower frequency bands and higher frequency bands. The high-frequency circuit 110 includes duplexers 10L1, 10L2, 10H1, and 10H2 and switches 20L and 20H. The duplexer 10L1 includes a transmit filter 12L1, a receive filter 14L1, and a matching circuit 16L1, the duplexer 10L2 includes a transmit filter 12L2, a receive filter 14L2, and a matching circuit 16L2, the duplexer 10H1 includes a transmit filter 12H1, a receive filter 14H1, and a matching circuit 16H1, and the duplexer 10H2 includes a transmit filter 12H2, a receive filter 14H2, and a matching circuit 16H2.

The transmit filter 12L1 is connected between a transmit terminal TxL1 and a common terminal 18L1, the transmit filter 12L2 is connected between a transmit terminal TxL2 and a common terminal 18L2, the transmit filter 12H1 is connected between a transmit terminal TxH1 and a common terminal 18H1, and the transmit filter 12H2 is connected between a transmit terminal TxH2 and a common terminal 18H2. The receive filter 14L1 is connected between a receive terminal RxL1 and the common terminal 18L1, the receive filter 14L2 is connected between a receive terminal RxL2 and the common terminal 18L2, the receive filter 14H1 is connected between a receive terminal RxH1 and the common terminal 18H1, and the receive filter 14H2 is connected between a receive terminal RxH2 and the common terminal 18H2. The matching circuit 16L1 is connected between the common terminal 18L1 and at least one of the transmit filter 12L1 and receive filter 14L1, the matching circuit 16L2 is connected between the common terminal 18L2 and at least one of the transmit filter 12L2 and receive filter 14L2, the matching circuit 16H1 is connected between the common terminal 18H1 and at least one of the transmit filter 12H1 and receive filter 14H1, the matching circuit 16H2 is connected between the common terminal 18H2 and at least one of the transmit filter 12H2 and receive filter 14H2.

The transmit filters 12L1 through 12H2 pass signals in the transmit bands out of signals input from the transmit terminals TxL1 through TxH2 respectively, and suppress other signals. That is to say, the transmit filters 12L1 through 12H2 have a loss of almost 0 in the transmit bands, and have very high impedance in other bands. The receive filters 14L1 through 14H2 pass signals in the receive bands out of signals input from the common terminals 18L1 through 18H2 respectively, and suppress other signals. That is to say, the receive filters 14L1 through 14H2 have a loss of almost 0 in the receive bands, and have very high impedance in other bands.

A surface acoustic wave filter or piezoelectric thin film resonator filter can be used for the transmit filters 12L1 through 12H2 and receive filters 14L1 through 14H2, for example.

The matching circuits 16L1 through 16H2 match impedance to prevent the transmit signals from entering the receive filters 14L1 through 14H2 and the receive signals from entering the transmit filters 12L1 through 12H2, respectively.

As described above, the duplexers 10L1 through 10H2 can transmit and receive transmit signals and receive signals with different frequencies simultaneously. As described above, the use of the duplexers 10L1 through 10H2 enables to perform communications using an FDD (Frequency Divisional Duplex) method.

The switch 20L is an SPnT (Single Pole n Throw) switch, and selects and connects one of the common terminals 18L1 and 18L2 to an antenna terminal AntL. The switch 20H is an SPnT (Single Pole n Throw) switch, and selects and connects one of the common terminals 18H1 and 18H2 to an antenna terminal AntH.

A switch using an FET (Field Effect Transistor) can be used for the switches 20L and 20H, for example. A CMOS (Complimentary Metal Oxide Semiconductor) FET or GaAs-FET can be used as the FET.

The high-frequency circuit 110 can simultaneously transmit and receive signals in the bands supported by the duplexer 10L1 or 10L2 selected by the switch 20L and the duplexer 10H1 or 10H2 selected by the switch 20H. For example, when the switch 20L selects the duplexer 10L1 and the switch 20H selects the duplexer 10H1, signals of the band supported by the duplexer 10L1 and the band supported by the duplexer 10H1 can be simultaneously transmitted and received. As described above, the use of the FDD method enables to simultaneously transmit signals of different bands. In addition, signals of different bands can be simultaneously receive. This enables to transmit and receive a sound and data simultaneously, for example. Or, data can be transmitted and received using two bands. The number of duplexers for the lower frequency bands and the higher frequency bands may be three or more. The highest frequency of the band supported by the duplexer coupled to the switch 20L is lower than the lowest frequency of the band supported by the duplexer coupled to the switch 20H.

Table 1 is a table that presents exemplary bands used in the high-frequency circuit.

TABLE 1

| CA | FREQUENCY [MHz] | | | | | | | |
|---|---|---|---|---|---|---|---|---|
| | TRANSMIT BAND | | RECEIVE BAND | | 2x TRANSMIT BAND | | 3x TRANSMIT BAND | |
| B4  | 1710 | 1755 | 2110 | 2155 | 3420 | 3510 | 5130 | 5265 |
| B17 | 704  | 716  | 734  | 746  | 1408 | 1432 | 2112 | 2148 |
| B3  | 1710 | 1785 | 1805 | 1880 | 3420 | 3570 | 5130 | 5355 |
| B8  | 880  | 915  | 925  | 960  | 1760 | 1830 | 2640 | 2745 |

As presented in Table 1, a description will be given of band 4, band 17, band 3, and band 8 in LTE (Long Term Evolution) or W-CDMA (Wide-Band Code Divisional Multiple Access) as examples. A description will first be given of band 4 and band 17. The transmit band of band 4 is 1710 to 1755 MHz, and the receive band is 2110 to 2155 MHz. On the other hand, the transmit band of band 17 is 704 to 716 MHz, and the receive band is 734 to 746 MHz. The third-order harmonics of the transmit band of band 17 (3×transmit band in Table 1) is 2112 to 2148 MHz. Therefore, the third-order harmonics of the transmit signal of band 17 overlaps the receive band of band 4.

Figure 2A:
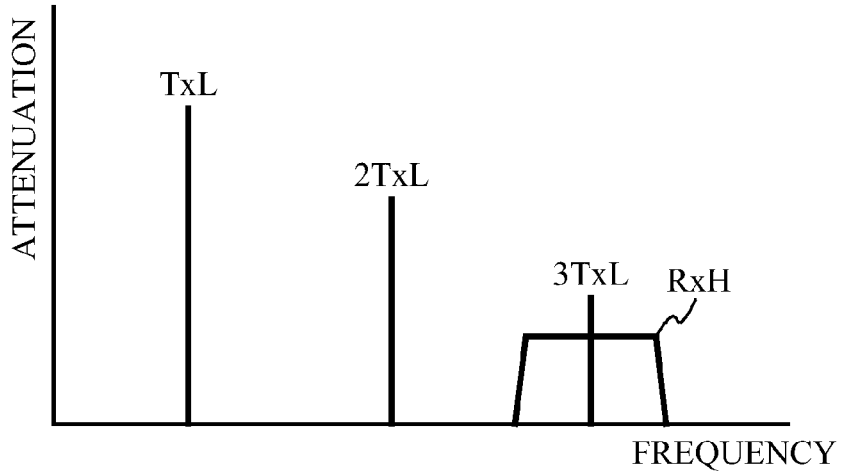
FIG. 2A and FIG. 2B are diagrams illustrating attenuation with respect to frequency.
Figure 2B:
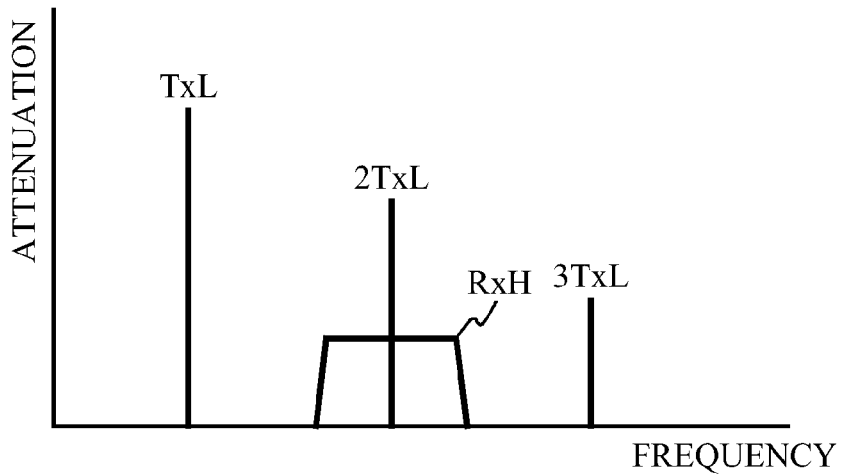

FIG. 2A and FIG. 2B are diagrams illustrating attenuation with respect to frequency. As illustrated in FIG. 2A, 3TxL, which is the third-order harmonics of a transmit signal TxL of band 17, overlaps the receive band RxH of band 4. Assume that the duplexer 10L1 supports band 17 and the duplexer 10H1 supports band 4 in FIG. 1. The duplexer 10L2 supports a lower frequency band comparable to band 17 and the duplexer 10H2 supports a higher frequency band comparable to band 4.

For example, the electrical power of the transmit signal of band 17 output from the antenna terminal AntL, which is indicated by an arrow 40, is 23 dBm, and the electrical power of the third-order harmonics of the transmit signal of band 17 is −60 to −80 dBm. The electrical power of the receive signal of band 4 input to the antenna terminal AntH, which is indicated by an arrow 42, is less than or equal to −100 dBm. When the isolation between the antenna terminals AntL and AntH indicated by an arrow 44 is approximately −10 dBm, the third-order harmonics of the transmit signal of band 17 indicated by an arrow 46 with an electrical power of −70 to −90 dBm is input to the antenna terminal AntH. In this case, the third-order harmonics of the transmit signal of band 17 becomes larger than the receive signal of band 4. This causes the receive signal of band 4 to be buried in the third-order harmonics of the transmit signal of band 17 when a transmit of the transmit signal of band 17 and a receive of the receive signal of band 4 are performed simultaneously. The above described electrical powers of signals are only exemplary examples.

Referring to Table 1, a description will be given of band 3 and band 8. The transmit band of band 3 is 1710 to 1785 MHz, and the receive band is 1805 to 1880 MHz. On the other hand, the transmit band of band 8 is 880 to 915 MHz, and the receive band is 925 to 960 MHz. The second order harmonics of the transmit band of band 8 (2×transmit band in Table 1) is 1760 to 1830 MHz. Therefore, the second order harmonics of a transmit signal of band 8 overlaps the receive band of band 3.

As illustrated in FIG. 2B, 2TxL, which is the second order harmonics of the transmit signal TxL of band 8, overlaps the receive band RxH of band 3. Assume that the duplexer 10L1 supports band 8 and the duplexer 10H1 supports band 3 in FIG. 1. In this case, as with the case of band 17 and band 4 described previously, the receive signal of band 3 is buried in the second order harmonics of the transmit signal of band 8 when a transmit of the transmit signal of band 8 and a receive of the receive signal of band 3 are performed simultaneously.

The reason why the harmonic of the transmit signal becomes large as described above is because the switch 20L is used. The switches 20L and 20H have a property that the harmonic becomes larger as the electrical power of the signal becomes larger. The following describes embodiments that prevent the harmonic of the transmit signal generated by the switch 20L from interfering with the receive signal.

First Embodiment

Figure 3:
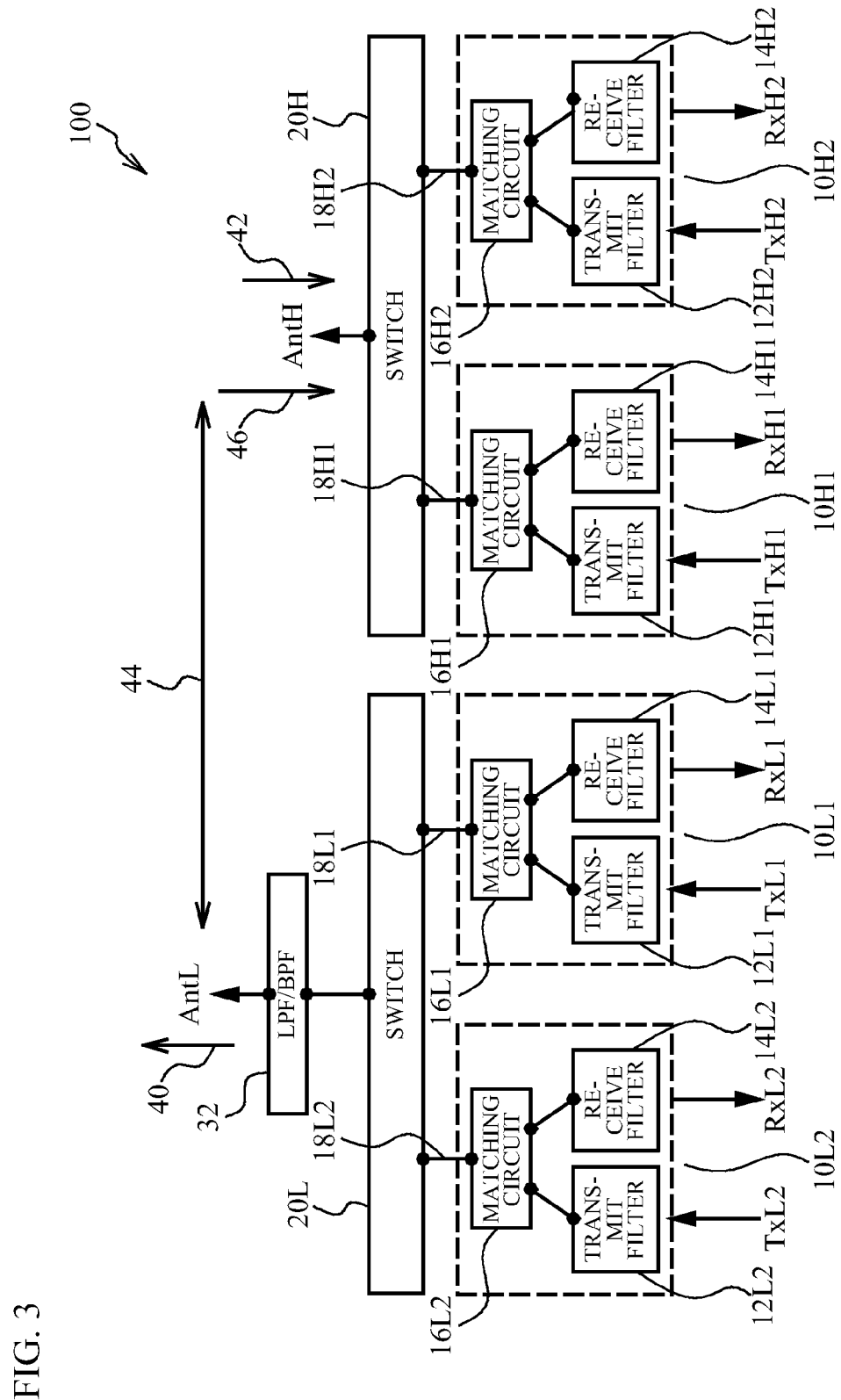
FIG. 3 is a block diagram of a high-frequency circuit in accordance with a first embodiment.

FIG. 3 is a block diagram of a high-frequency circuit in accordance with a first embodiment. As illustrated in FIG. 3, a high-frequency circuit 100 includes an LPF (low-pass filter) or BPF (bandpass filter) 32 connected between the switch 20L and the antenna terminal AntL. The LPF or BPF 32 passes signals in the transmit/receive bands of the duplexers 10L1 and 10L2, and does not pass the harmonic in the transmit band. Other configuration is the same as that of the comparative example in FIG. 1, and thus a description is omitted.

As with the comparative example, a description will be given of a case where a transmit of a signal of band 17 and a receive of a signal of band 4 are simultaneously performed. The first embodiment provides the LPF/BPF 32, and thus enables to make the electrical power of the third-order harmonics of the transmit signal of band 17 output to the antenna terminal AntL −100 to −110 dBm. Therefore, the electrical power of the third-order harmonics (arrow 46) of the transmit signal of band 17 input to the antenna terminal AntH can be made to be −110 to −120 dBm, for example. Thus, the electrical power of the third-order harmonics of the transmit signal of band 17 can be made to be smaller than the electrical power of the receive signal of band 4.

The first embodiment configures the duplexers 10L1 and 10L2 (first duplexers) to include the transmit filters 12L1 and 12L2 (first transmit filters), the receive filters 14L1 and 14L2 (first receive filters), and the common terminals 18L1 and 18L2 (first common terminals), respectively. Each of the transmit filters 12L1 and 12L2 has a first transmit band. Each of the receive filters 14L1 and 14L2 has a first receive band. First ends of the transmit filter 12L1 and receive filter 14L1 are commonly connected to the common terminal 18L1, and first ends of the transmit filter 12L2 and receive filter 14L2 are commonly connected to the common terminal 18L2. The switch 20L (first switch) selects and connects one of the common terminals 18L1 and 18L2 to the antenna terminal AntL (first antenna).

The duplexers 10H1 and 10H2 (second duplexers) includes the transmit filters 12H1 and 12H2 (second transmit filters), the receive filters 14H1 and 14H2 (second receive filters), and the common terminals 18H1 and 18H2 (second common terminals), respectively. Each of the transmit filters 12H1 and 12H2 has a second transmit band higher in frequency than the first transmit band. Each of the receive filters 14H1 and 14H2 has a second receive band higher in frequency than the first receive band. First ends of the transmit filter 12H 1 and receive filter 14H1 are commonly connected to the common terminal 18H1, first ends of the transmit filter 12H2 and receive filter 14H2 are commonly connected to the common terminal 18H2, and the common terminals 18H1 and 18H2 are connected to the antenna terminal AntH (second antenna).

In the above described configuration, the LPF or BPF 32 is connected between the antenna terminal AntL and the switch 20L, passes signals in the first transmit band and first receive band, and blocks signals in the second transmit band and second receive band. The LPF or BPF 32 mainly blocks the harmonic of the signal of the first transmit band generated in the switch 20L. Thus, it is possible to prevent the above described harmonic from becoming larger than the receive signals of the bands supported by the duplexers 10H1 and 10H2. As described above, the distorted signal of the transmit signal of the lower frequency band can be prevented from becoming stronger than the receive signal of the higher frequency band.

In addition, in the high-frequency circuit 100, the distorted signal of the transmit signal of the lower frequency band easily interferes with the receive signal of the higher frequency band when a transmit of the transmit signal of the first transmit band and a receive of the receive signal of the second receive band are performed simultaneously. Therefore, in such a case, the LPF or BPF 32 is preferably connected between the antenna terminal AntL and the switch 20L.

Furthermore, the LPF or BPF 32 preferably blocks the harmonic of the first transmit band to the extent that the signal of the second receive band is not affected. This can prevent the distorted signal of the transmit signal of the lower frequency band from becoming stronger than the receive signal of the higher frequency band.

The switch 20H (second switch) may select and connect one of the duplexers 10H1 and 10H2 and common terminals 18H1 and 18H2 to the antenna terminal AntH.

In the first embodiment, the antenna to which the antenna terminal AntL is connected differs from the antenna to which the antenna terminal AntH is connected. The common terminals 18L1 and 18L2 are not connected to the antenna terminal AntH, and the common terminals 18H1 and 18H2 are not connected to the antenna terminal AntL. This enables to make the isolation between the antenna terminal AntL and the antenna terminal AntH larger than that in a case where the antenna terminal AntL and the antenna terminal AntH are made to be a single antenna as described in a second embodiment described later.

Second Embodiment

Figure 4:
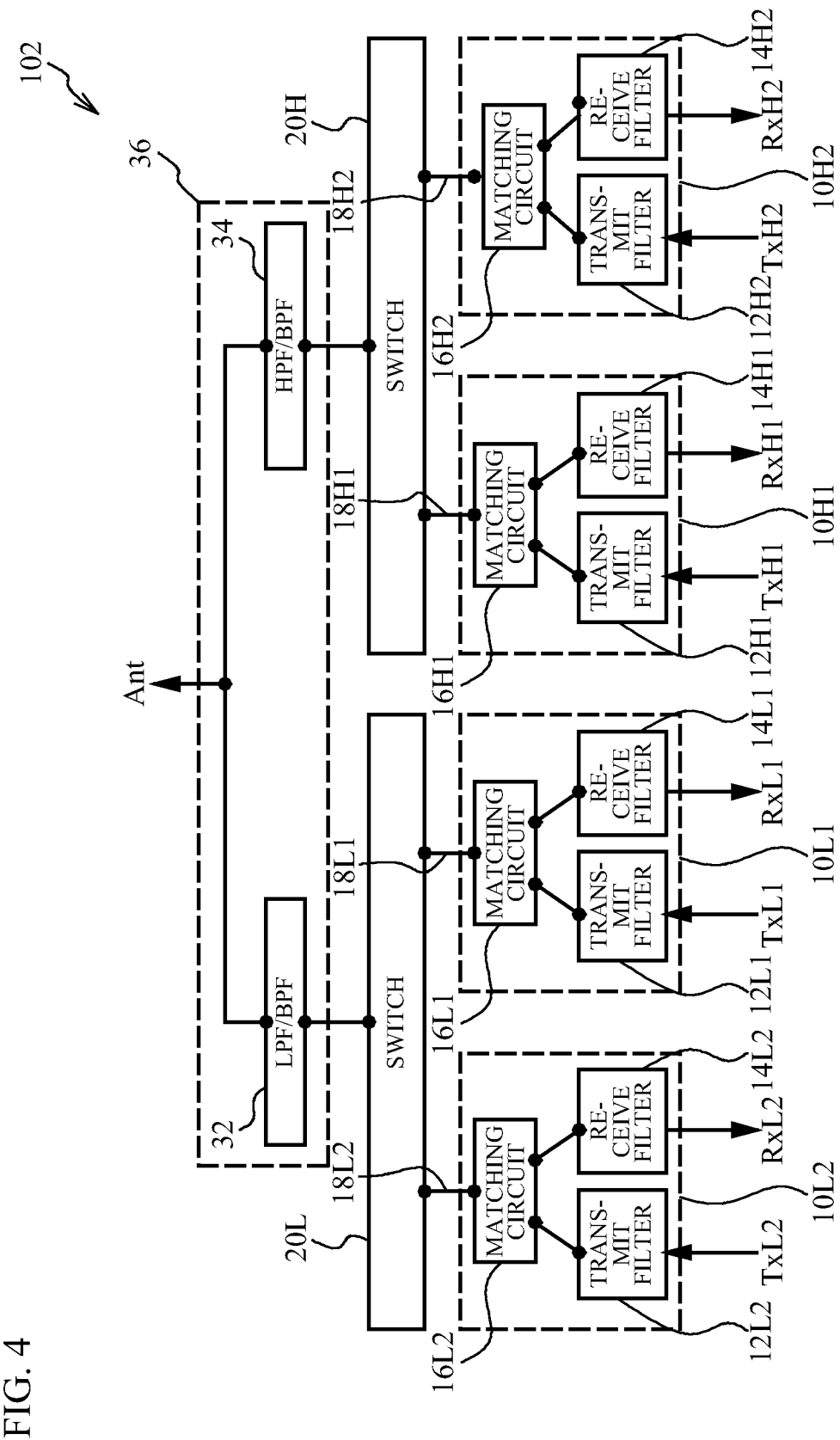
FIG. 4 is a block diagram of a high-frequency circuit in accordance with a second embodiment.

FIG. 4 is a block diagram of a high-frequency circuit in accordance with the second embodiment. In a high-frequency circuit 102, an antenna terminal Ant is shared in lower frequency bands and higher frequency bands. A diplexer 36 is connected between the antenna terminal Ant and the switches 20L and 20H. The diplexer 36 includes the LPF or BPF 32 and an HPF (high-pass filter) or BPF 34. The LPF or BPF 32 is connected between the antenna terminal Ant and the switch 20L. The HPF or BPF 34 is connected between the antenna terminal Ant and the switch 20H, passes signals in the transmit bands and receive bands of the duplexers 10H1 and 10H2, and blocks signals in the transmit bands and receive bands of the duplexers 10L1 and 10L2. Other configuration is the same as that of the first embodiment, and thus a description thereof is omitted.

As described in the second embodiment, the antenna terminals AntL and AntH of the first embodiment can be made to be the single antenna terminal Ant. This can reduce the number of antennas. In this case, the HPF or BPF 34 is preferably located between the duplexers 10H1 and 10H2 and the antenna terminal Ant. This enables to prevent the transmit signals of the duplexers 10L1 and 10L2 from entering the switch 20H. Thus, it is possible to prevent the harmonics of the transmit signals of the duplexers 10L1 and 10L2 from being generated in the switch 20H, for example.

Third Embodiment

Figure 5:
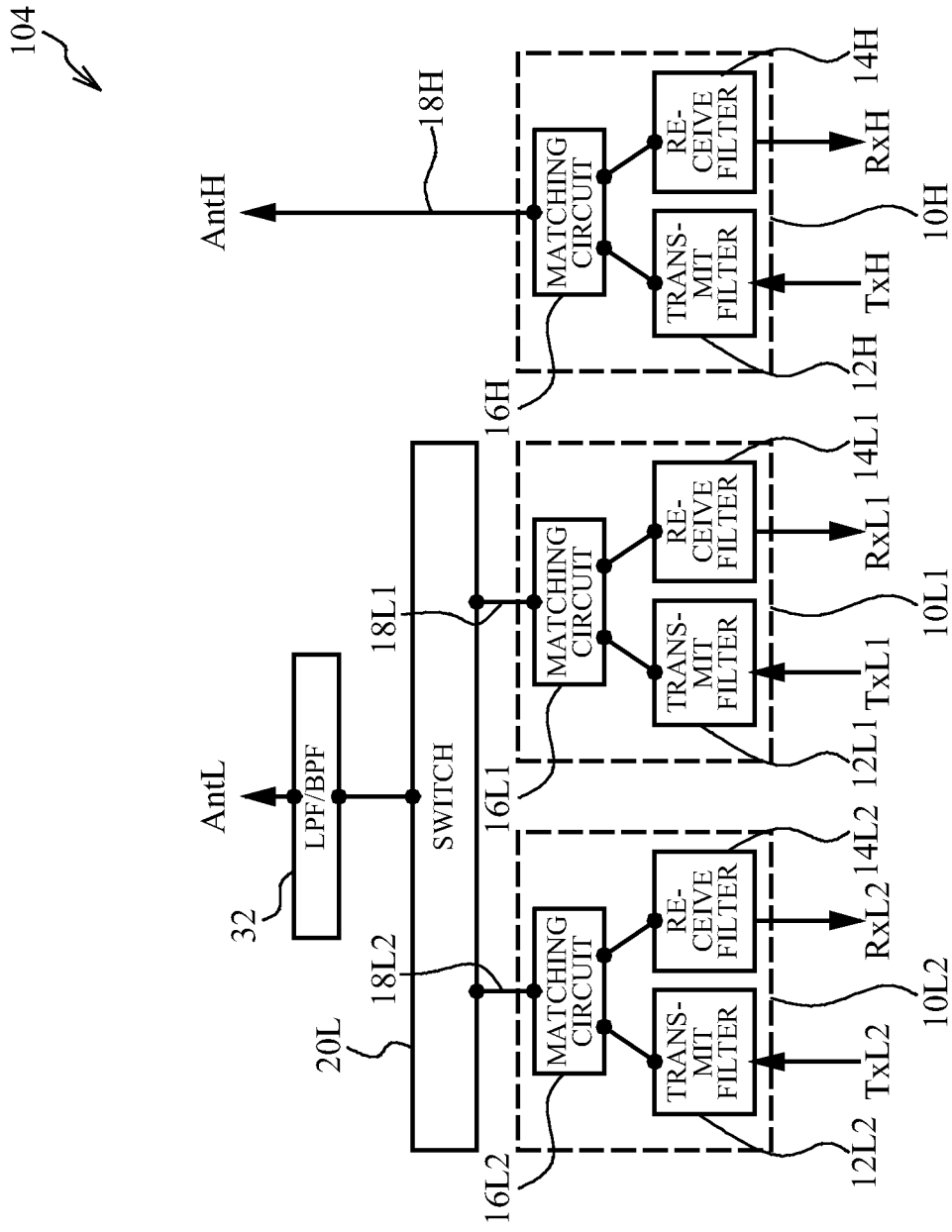
FIG. 5 is a block diagram of a high-frequency circuit in accordance with a third embodiment.

FIG. 5 is a block diagram of a high-frequency circuit in accordance with a third embodiment. As illustrated in FIG. 5, in a high-frequency circuit 104, a duplexer for the higher frequency band is only one duplexer 10H. In this case, the switch for the higher frequency band can be omitted, and the antenna terminal AntH is connected to a common terminal 18H without the switch. Other configuration is the same as that of the first embodiment, and thus a description is omitted.

Fourth Embodiment

Figure 6:
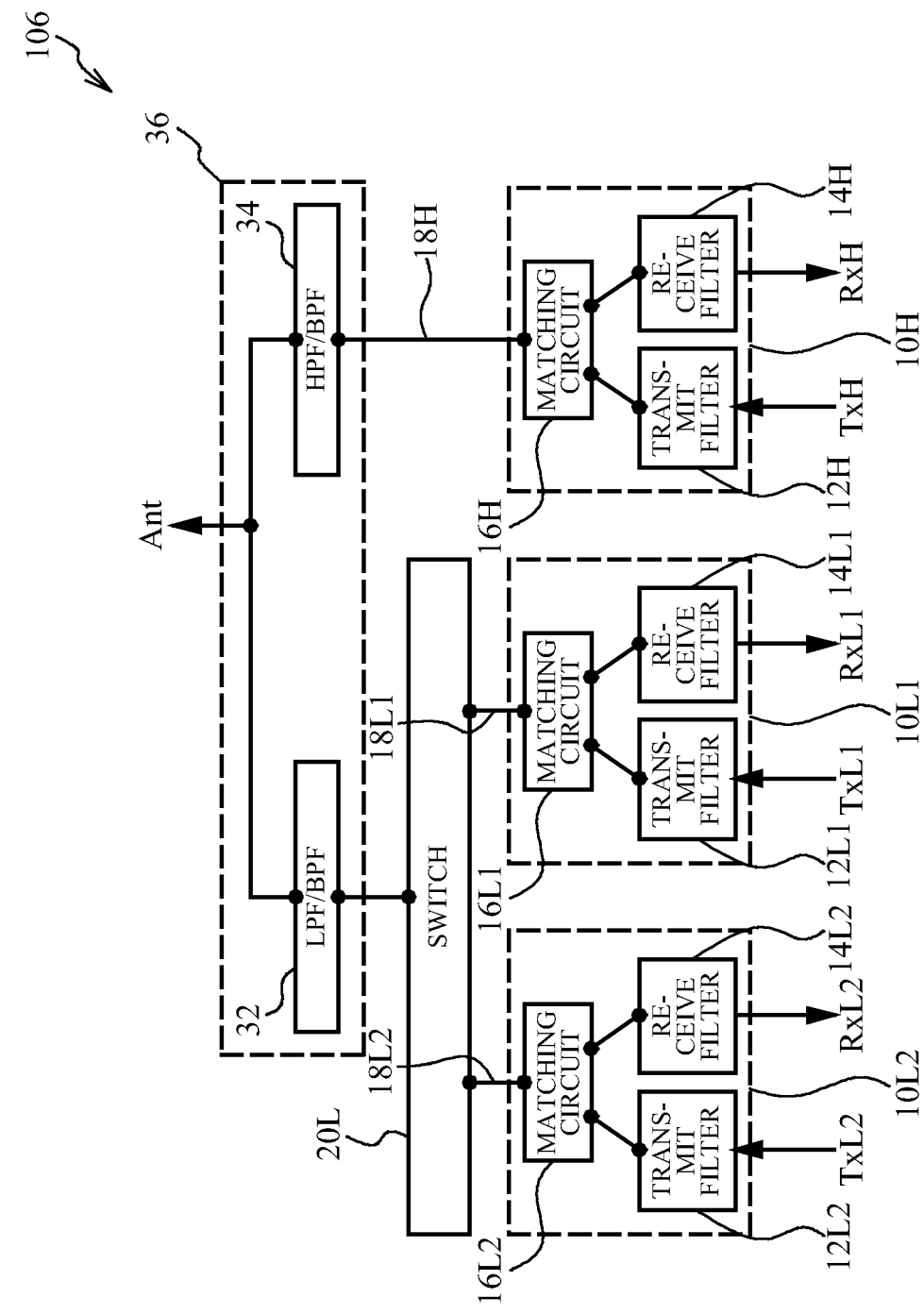
FIG. 6 is a block diagram of a high-frequency circuit in accordance with a fourth embodiment.

FIG. 6 is a block diagram of a high-frequency circuit in accordance with a fourth embodiment. As illustrated in FIG. 6, in a high-frequency circuit 106, a duplexer for the higher frequency band is only one duplexer 10H, and the HPF or BPF 34 of the diplexer 36 is connected between the antenna terminal AntH and the common terminal 18H. Other configuration is the same as that of the second embodiment, and thus a description is omitted.

Fifth Embodiment

Figure 7A:
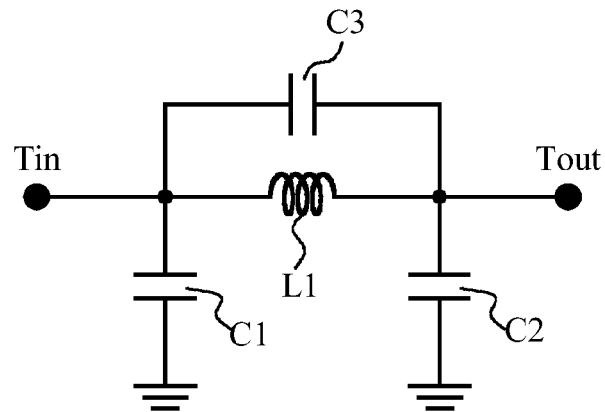
FIG. 7A is a circuit diagram illustrating an exemplary LPF.
Figure 7B:
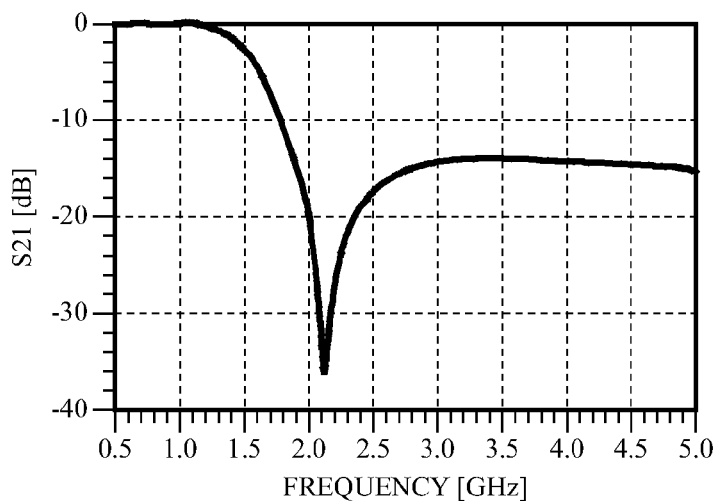
FIG. 7B is a diagram illustrating the pass characteristic of the LPF.
Figure 7C:
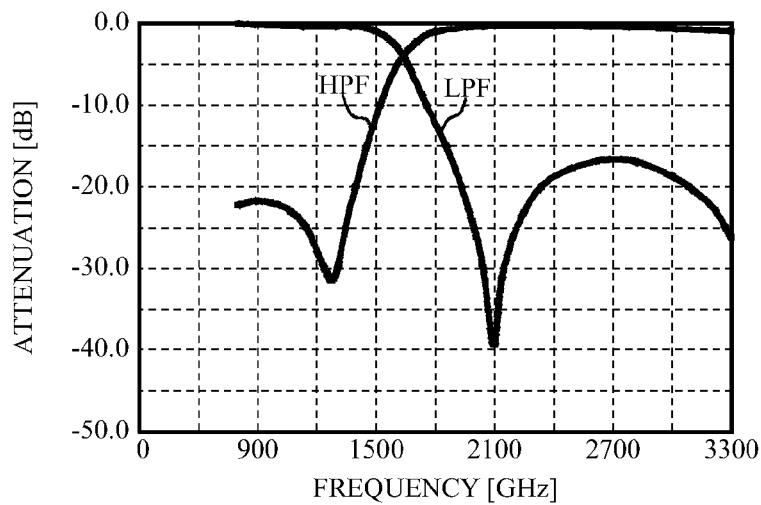
FIG. 7C is a diagram illustrating the pass characteristic of a diplexer.

A fifth embodiment mounts the high-frequency circuit of the second embodiment on a wiring substrate. FIG. 7A is a circuit diagram illustrating an exemplary LPF, FIG. 7B is a diagram illustrating the pass characteristic of the LPF, and FIG. 7C is a diagram illustrating the pass characteristic of a diplexer. As illustrated in FIG. 7A, the LPF includes an inductor L1 and capacitors C1 through C3. The inductor L1 is electrically connected in series between an input terminal Tin and an output terminal Tout. The capacitor C3 is electrically connected in series between the input terminal Tin and the output terminal Tout. The capacitor C1 is connected between a first end of the inductor L1 and a ground, and the capacitor C2 is electrically connected between a second end of the inductor L1 and a ground. As illustrated in FIG. 7B, the use of the LPF illustrated in FIG. 7A enables to make the S21 close to 0 dB at frequencies less than or equal to 1.5 GHz, for example. On the other hand, the S21 can be made to be less than or equal to −15 dB at frequencies greater than or equal to 2 GHz.

As illustrated in FIG. 7C, the LPF passes signals with frequencies less than or equal to 1500 MHz, and blocks signals with frequencies greater than or equal to 2000 MHz. The HPF passes signals with frequencies greater than or equal to 2000 MHz, and blocks signals with frequencies less than or equal to 1500 MHz. The above described diplexer can be used in the second embodiment.

Figure 8:
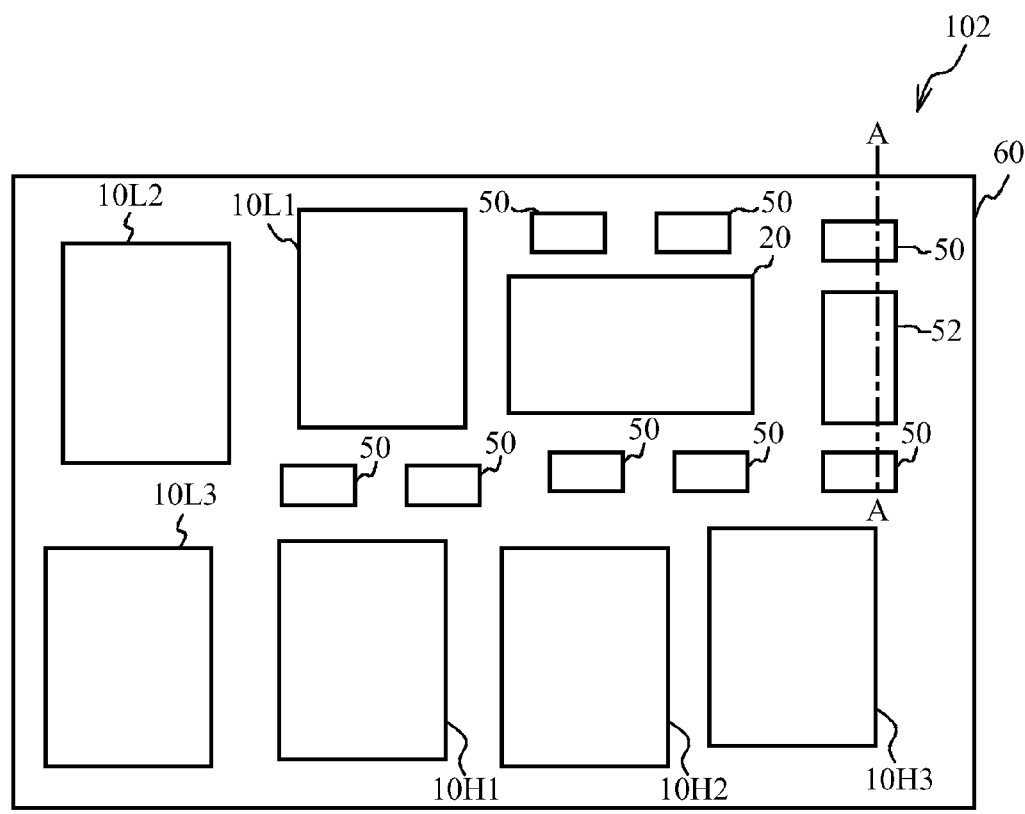
FIG. 8 is a plan view of a high-frequency circuit in accordance with a fifth embodiment.

FIG. 8 is a plan view of a high-frequency circuit in accordance with the fifth embodiment. As illustrated in FIG. 8, in the high-frequency circuit 102, the duplexers 10L1 through 10L3 and 10H1 through 10H3, a switch 20, a part 52 of the diplexer, and chip components 50 are mounted on a wiring substrate 60. The switches 20L and 20H are installed in the switch 20.

Figure 9A:
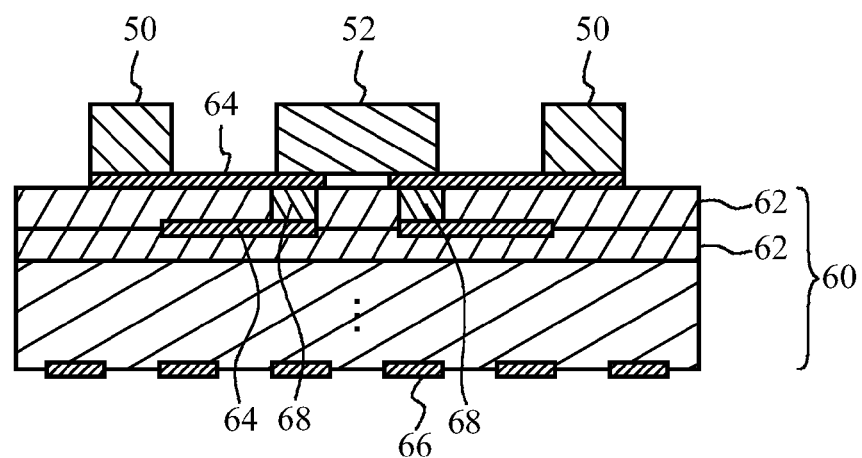
FIG. 9A and FIG. 9B are diagrams illustrating cross-sections taken along line A-A in FIG. 8.
Figure 9B:
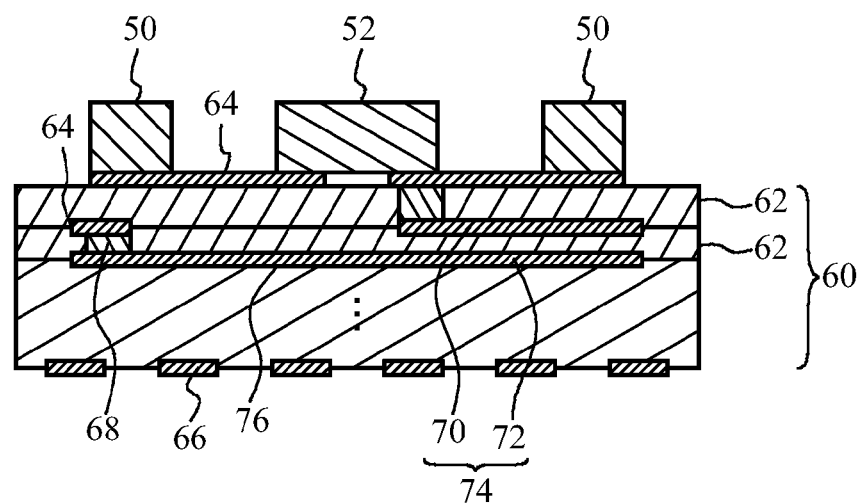

FIG. 9A and FIG. 9B are diagrams illustrating cross-sections taken along line A-A in FIG. 8. As illustrated in FIG. 9A and FIG. 9B, the wiring substrate 60 includes insulating layers 62. The insulating layer 62 is a resin such as an epoxy resin or ceramic. Wirings 64 are formed on the insulating layers 62. Pads 66 are formed on the bottom surface of the wiring substrate 60. The wirings 64 are electrically connected to each other by via wirings 68, and the wirings 64 are electrically connected to the pads 66 by the via wirings 68. The wirings 64, the pads 66, and the via wirings 68 are formed of a metal such as copper for example. The chip components 50 and the part 52 of the diplexer are mounted on the upper surface of the wiring substrate 60. In FIG. 9A, the chip component 50 and the part 52 of the diplexer are electrically interconnected by the wiring 64 and the via wiring 68. In FIG. 9B, an inductor 76 is formed by the wiring 64, and a capacitor 74 is formed by electrodes 70 and 72 and the insulating layer 62 located between the electrodes 70 and 72. The electrodes 70 and 72 are formed by the wiring 64.

As illustrated in FIG. 9A, at least a part of the diplexer 36 (i.e. at least a part of the LPF or BPF 32 and HPF or BPF 34) may be formed by the chip component 50 mounted on the wiring substrate 60. As illustrated in FIG. 9B, a part of the diplexer 36 (i.e. at least a part of the LPF or BPF 32 and HPF or BPF 34) may be formed in the wiring substrate 60.

The fifth embodiment configures the high-frequency circuit 102 to include the wiring substrate 60 on which at least one of the duplexers and at least one of the switches are mounted. At least one of the LPF or BPF 32 and HPF or BPF 34 may be formed by at least one of a discrete component such as the chip component 50 and the wiring 64 formed in the wiring substrate 60. The fifth embodiment describes a case where the high-frequency circuit 102 of the second embodiment is mounted on the wiring substrate 60, but the high-frequency circuits of other embodiments may be mounted on a substrate such as the wiring substrate 60.

Sixth Embodiment

Figure 10:
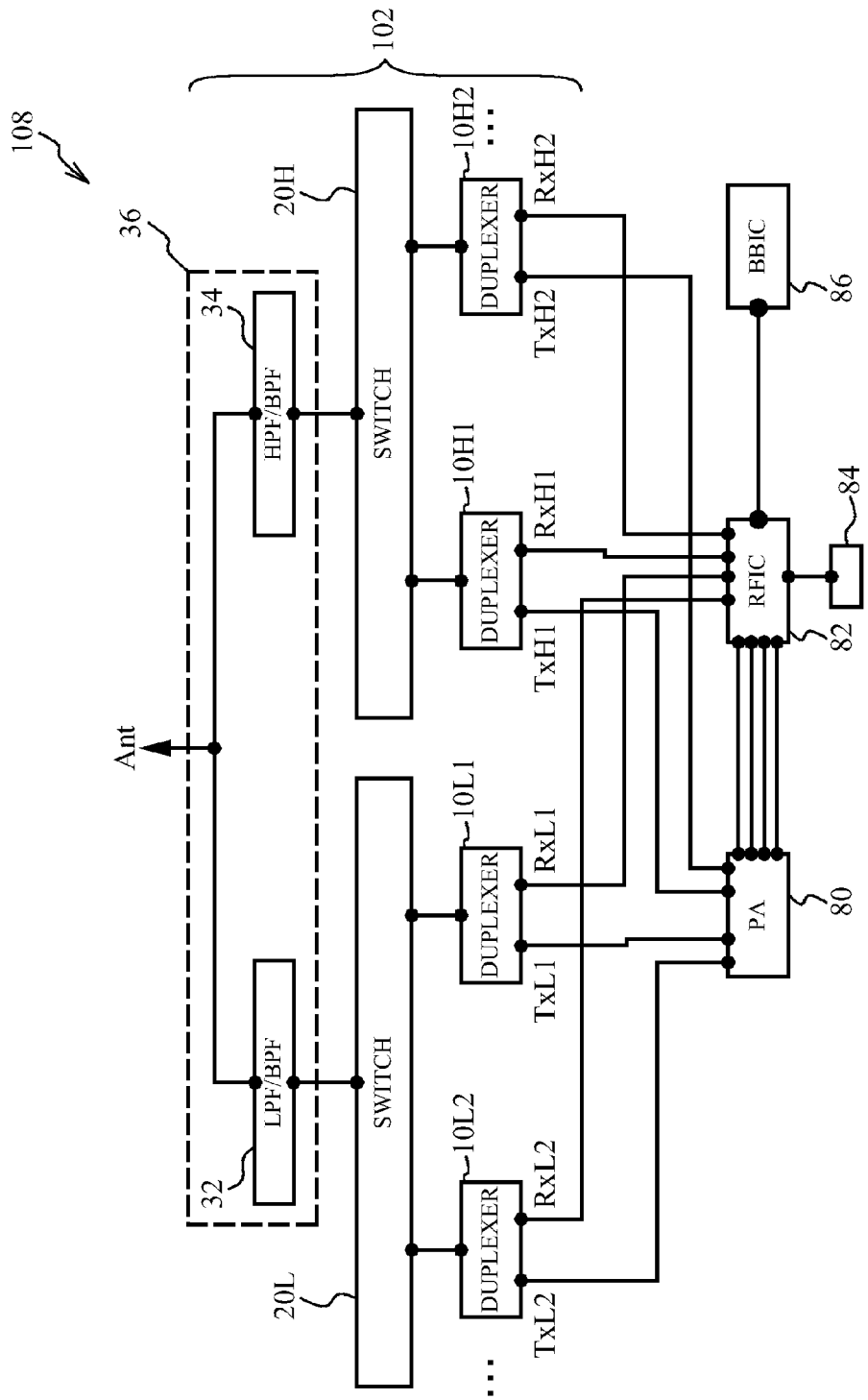
FIG. 10 is a block diagram of a communication device in accordance with a sixth embodiment.

A sixth embodiment is an exemplary communication device using the second embodiment. FIG. 10 is a block diagram illustrating a communication device in accordance with a sixth embodiment. As illustrated in FIG. 10, a communication device 108 includes the high-frequency circuit 102 of the second embodiment, a power amplifier (PA) 80, an RFIC (Radio Frequency Integrated Circuit) 82, an oscillator 84, and a BBIC (Base Band IC) 86. The BBIC 86 generates a transmit signal in a baseband, and receives a receive signal. The oscillator 84 generates a locally-generated signal. The RFIC 82 up-converts the transmit signal of the baseband using the locally-generated signal, and outputs it to the power amplifier 80. In addition, the RFIC 82 amplifies the receive signals output from the receive terminals RxL1, RxL2, RxH1, and RxH3 of the high-frequency circuit 102 by an LNA (Low Noise Amplifier). The RFIC 82 down-converts the amplified receive signal using the locally-generated signal, and outputs it to the BBIC 86. The power amplifier 80 amplifies the transmit signal with an RF frequency, and outputs it to the transmit terminals TxL1, TxL2, TxH1, and TxH2. The configuration of the high-frequency circuit 102 is the same as that of the second embodiment, and a description is omitted. As described in the sixth embodiment, the frequency circuits of the first through fifth embodiments can be used in the communication device.

Although the embodiments of the present invention have been described in detail, it is to be understood that the various change, substitutions, and alterations could be made hereto without departing from the spirit and scope of the invention.

What is claimed is:

1. A high-frequency circuit comprising:
   first duplexers, each including:
      a first transmit filter having a first transmit band,
      a first receive filter having a first receive band, and
      a first common terminal to which a first end of the first transmit filter and a first end of the first receive filter are commonly connected;
   a first switch that selects and connects one of the first common terminals to a first antenna;
   an LPF (low pass filter) or BPF (band pass filter) that is connected between the first antenna and the first switch, and passes a signal in the first transmit band and the first receive band; and
   a second duplexer including:
      a second transmit filter having a second transmit band higher in frequency than the first transmit band,
      a second receive filter having a second receive band higher in frequency than the first receive band, and
      a second common terminal that is connected to a second antenna and to which a first end of the second transmit filter and a first end of the second receive filter are commonly connected,
   wherein a transmit of a transmit signal of the first transmit band and a receive of a receive signal of the second receive band are performed simultaneously, and
   wherein a frequency of a second order harmonics or a third order harmonics of the transmit signal overlaps the second receive band.

2. The high-frequency circuit according to claim 1, wherein
   the LPF or BPF does not pass a harmonic of the first transmit band.

3. The high-frequency circuit according to claim 1, further comprising:
   a plurality of the second duplexers, and
   a second switch that selects and connects one of the second common terminals of the plurality of the second duplexers to the second antenna.

4. The high-frequency circuit according to claim 1, wherein
   the first antenna is separate from the second antenna,
   the first common terminal is not connected to the second antenna, and
   the second common terminal is not connected to the first antenna.

5. The high-frequency circuit according to claim 1, further comprising:
an HPF (high pass filter) or BPF that is connected between the second duplexer and the second antenna and passes a signal in the second transmit band and the second receive band.

6. The high-frequency circuit according to claim 5, wherein
the first antenna and the second antenna are a single antenna.

7. The high-frequency circuit according to claim 1, further comprising:
a substrate on which the first duplexer, the first switch, and the second duplexer are mounted, wherein
the LPF or BPF is formed by at least one of a discrete component and a wiring formed in the substrate.

8. A communication device comprising:
the high-frequency circuit according to claim 1.

* * * * *